(12) United States Patent
Cranton et al.

(10) Patent No.: US 8,056,245 B2
(45) Date of Patent: Nov. 15, 2011

(54) METHOD AND APPARATUS FOR ALIGNING COLLIMATED LIGHT BEAMS

(75) Inventors: Brian W. Cranton, Sanbornton, NH (US); Steven E. Morin, Nottingham, NH (US); Steven E. Dolbec, Nashua, NH (US); Matthew Tapley, Manchester, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 896 days.

(21) Appl. No.: 12/061,117

(22) Filed: Apr. 2, 2008

(65) Prior Publication Data

US 2011/0173822 A1    Jul. 21, 2011

Related U.S. Application Data

(60) Provisional application No. 60/909,786, filed on Apr. 3, 2007, provisional application No. 60/939,377, filed on May 22, 2007.

(51) Int. Cl.
*G01C 15/00* (2006.01)
*F41G 1/46* (2006.01)

(52) U.S. Cl. .................. 33/263; 33/286; 33/276; 42/141

(58) Field of Classification Search .................... 33/263, 33/265, 275 R, 276, 286, DIG. 21
See application file for complete search history.

(56) References Cited

U.S. PATENT DOCUMENTS

| | | | | |
|---|---|---|---|---|
| 3,909,952 A | * | 10/1975 | Lagasse | 33/286 |
| 6,964,106 B2 | * | 11/2005 | Sergyeyenko et al. | 33/286 |
| 2006/0070251 A1 | * | 4/2006 | Wu | 33/286 |
| 2008/0276473 A1 | * | 11/2008 | Raschella et al. | 33/286 |
| 2009/0241357 A1 | * | 10/2009 | Raschella et al. | 33/228 |
| 2011/0173871 A1 | * | 7/2011 | Moore et al. | 42/114 |

* cited by examiner

*Primary Examiner* — G. Bradley Bennett

(57) ABSTRACT

An optical bench configured to hold two or more sources of collimated light utilizes prisms that when rotated generate rings of possible angular directions of light that overlap at one or more locations at which the two or more beams are coaligned.

31 Claims, 11 Drawing Sheets

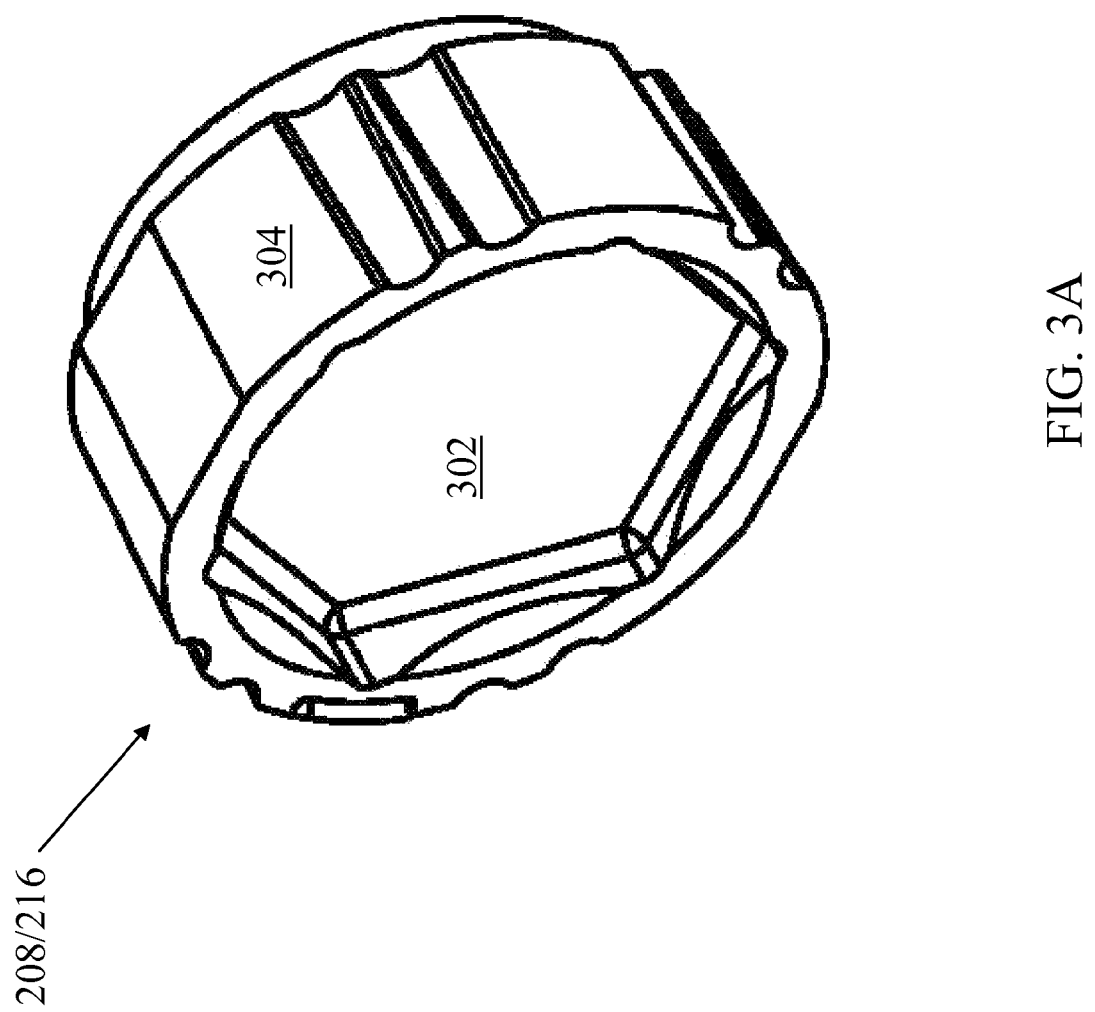

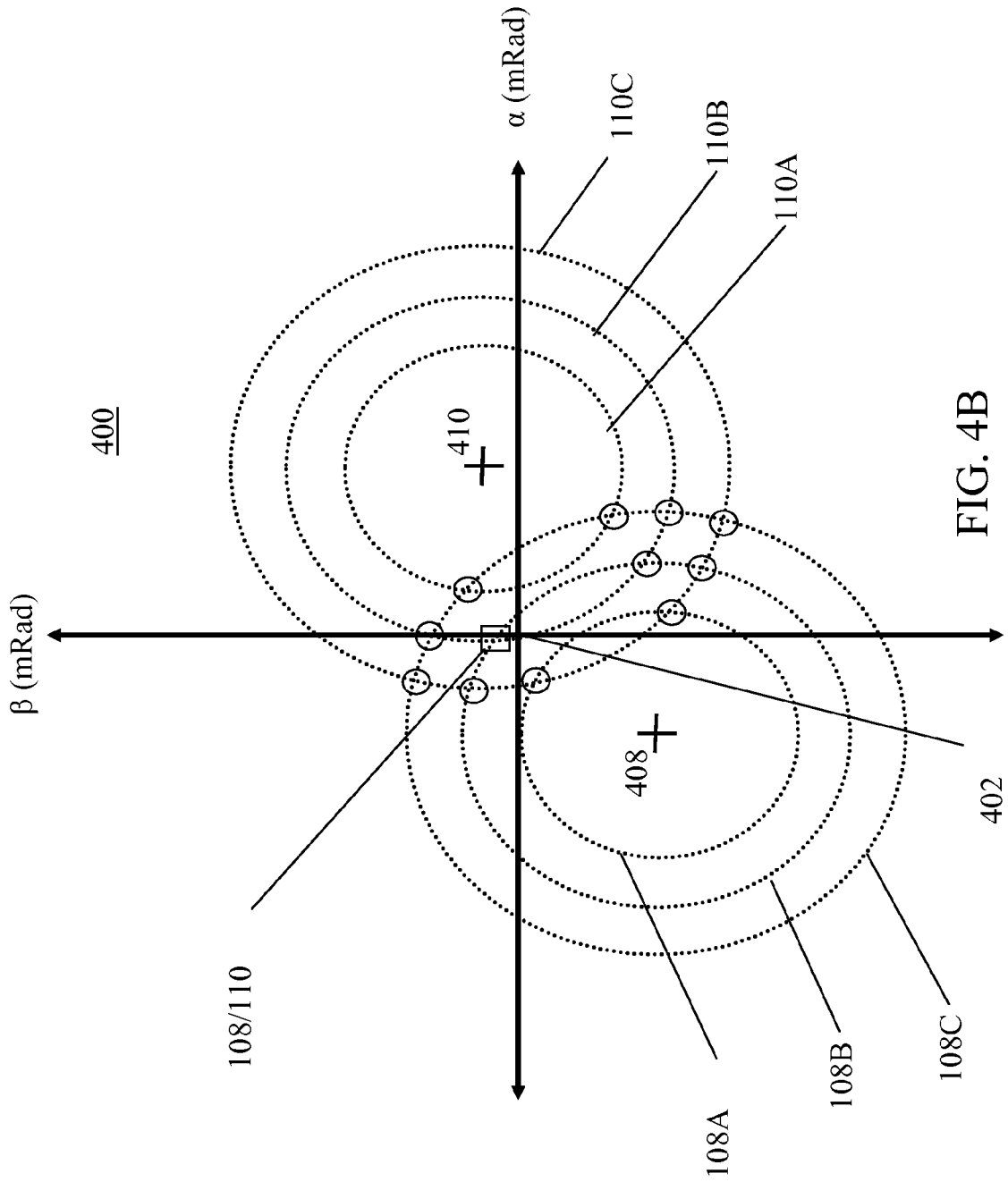

US 8,056,245 B2

METHOD AND APPARATUS FOR ALIGNING COLLIMATED LIGHT BEAMS

CROSS-REFERENCE TO RELATED APPLICATIONS

The present application claims the benefit of U.S. provisional patent application Ser. No. 60/909,786, filed Apr. 3, 2007, and Ser. No. 60/939,377, filed May 22, 2007, the entire disclosures of which are incorporated herein by reference.

BACKGROUND OF INVENTION

Soldiers are required to rapidly acquire, identify, and accurately fire on enemy targets and may use weapon-mounted sights with visible and infrared light sources generated by one or more lasers to produce collimated beams of light for use in daytime and nighttime missions. These sights may be mounted on small arms such as the M4A1 carbine and other weapons and are used to provide better target observation, illumination, and marking. Coaligned visible and infrared lasers may be boresighted to assist in operation of the weapon. Unlike visible lasers, infrared lasers are only viewable with a night vision device, a phosphorescence material, thermal imager, or other device of similar function. Coaligning visible and infrared lasers allows a soldier to boresight the infrared laser of a weapon mounted sight using just the visible laser (i.e. without the need for a night vision device to see the infrared light beam).

An optical bench sub-assembly located within a weapon mounted housing may be used to hold the electrical and optical components of the coaligned and collimated lasers. The housing may provide protection from unintended contact or debris. The housing may be coupled to a weapon with a suitable attachment mechanism, for example a rail grabber, slide-lock mechanism, or other clamp.

Mechanical adjustors extending through the housing and in contact with the optical bench sub-assembly may be used to steer the optical axis of the coaligned light beams relative to the housing. This may enable a user to boresight the previously coaligned light beams to some reference, such as a point of impact of a projectile at a known distance or a barrel mounted boresight laser.

The degree of coalignment between two collimated lasers can be quantified by measurement tools and expressed as an angle, typically given in thousandths of a radian (mRad). The degree of coalignment accomplished by passive, snap-together mechanical designs, that is designs which do not employ active feedback, are limited by a tradeoff between size and the precision of the components used. For example, the coalignment of a weapon mountable snap-together design might be realistically limited to about 15 mRad. For effective use at ranges of 200-800 meters, substantially better coalignment, e.g. less than 2.0 mRad, is desired which typically requires an active alignment scheme that employs feedback from a measurement device and adjustable compensators during the coalignment process.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 3A is a perspective view of a prism consistent with an exemplary embodiment.

FIG. 4B shows an illustration of measurements and calculations useful in coaligning a first collimated light beam and a second collimated light beam consistent with an exemplary embodiment.

DETAILED DESCRIPTION

Figure 1A:
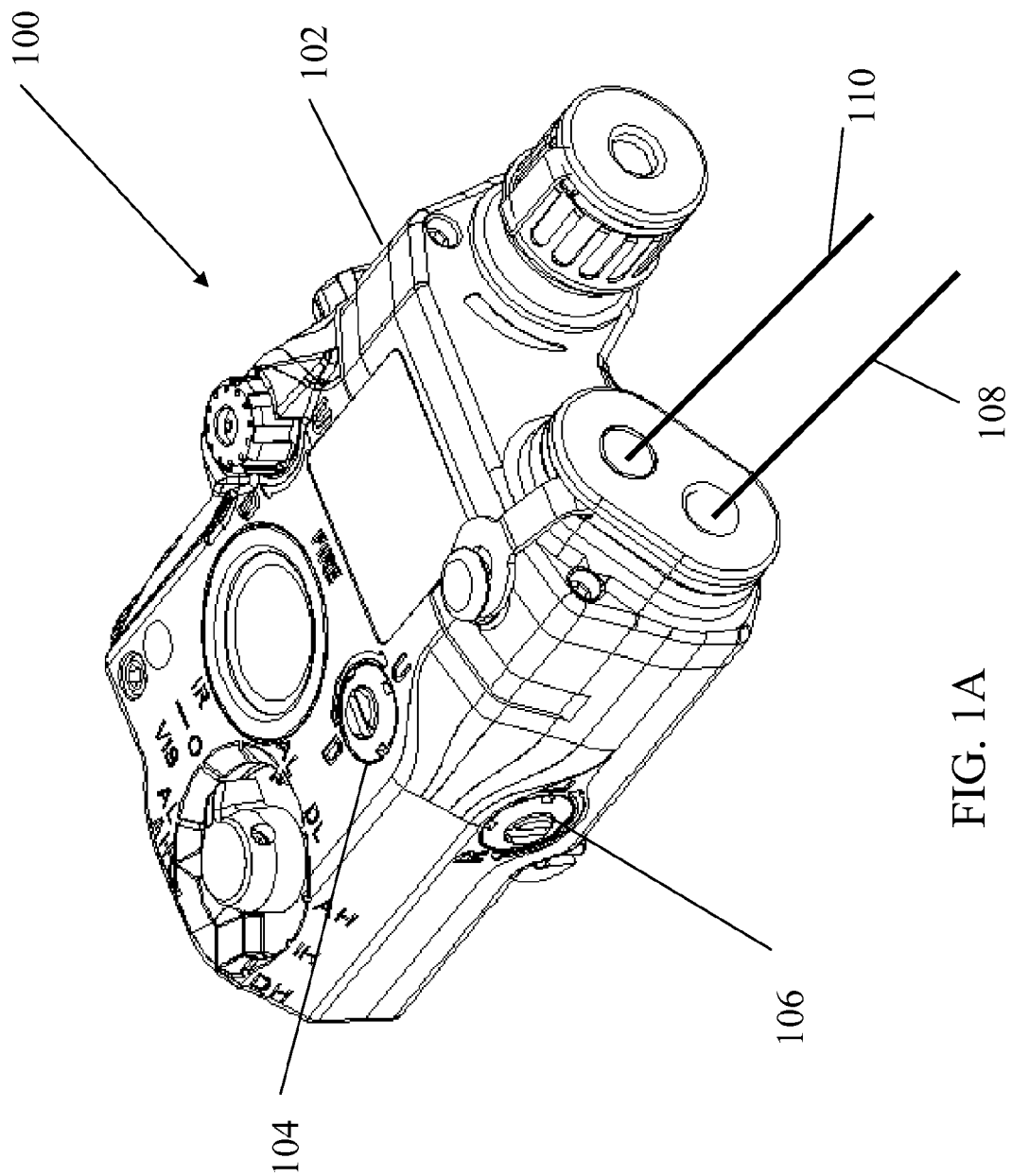
FIG. 1A is an isometric view of a weapon mountable sight consistent with an exemplary embodiment.

FIG. 1A is an isometric view of a weapon mountable sight 100. The sight 100 may generate a first collimated light beam 108, for example a visible light beam, and a second collimated light beam 110, for example an infrared light beam, to provide better observation, illumination, and marking of a target. The first light beam 108 may be coaligned with the second light beam 110. Coaligned is intended to mean that the two light beams (e.g. visible and infrared) are parallel to within an acceptable tolerance and collimated is intended to mean that the light has little or no divergence in each wavelength, i.e. it has a focus at infinity or some other distant point. The sight 100 may have a housing 102 for providing protection to internal components from unintended contact or debris. The sight 100 may be removably coupleable to a weapon 504 (see FIG. 5) such as the M4A1 carbine or other weapon with a suitable attachment method, for example a rail grabber, slide-lock mechanism, or other clamp. Alternatively, a sight incorporating this embodiment may be incorporated in and/or formed as part of a weapon. For use after the sight 100 is coupled to a weapon, the housing 102 may have a first adjustor 104 and a second adjustor 106 to allow an operator to boresight the previously coaligned pair of first and second collimated light beams 108, 110 with a projectile point of impact on a target at a known distance or with a boresight alignment tool, for example a barrel mounted boresight laser.

Figure 1B:
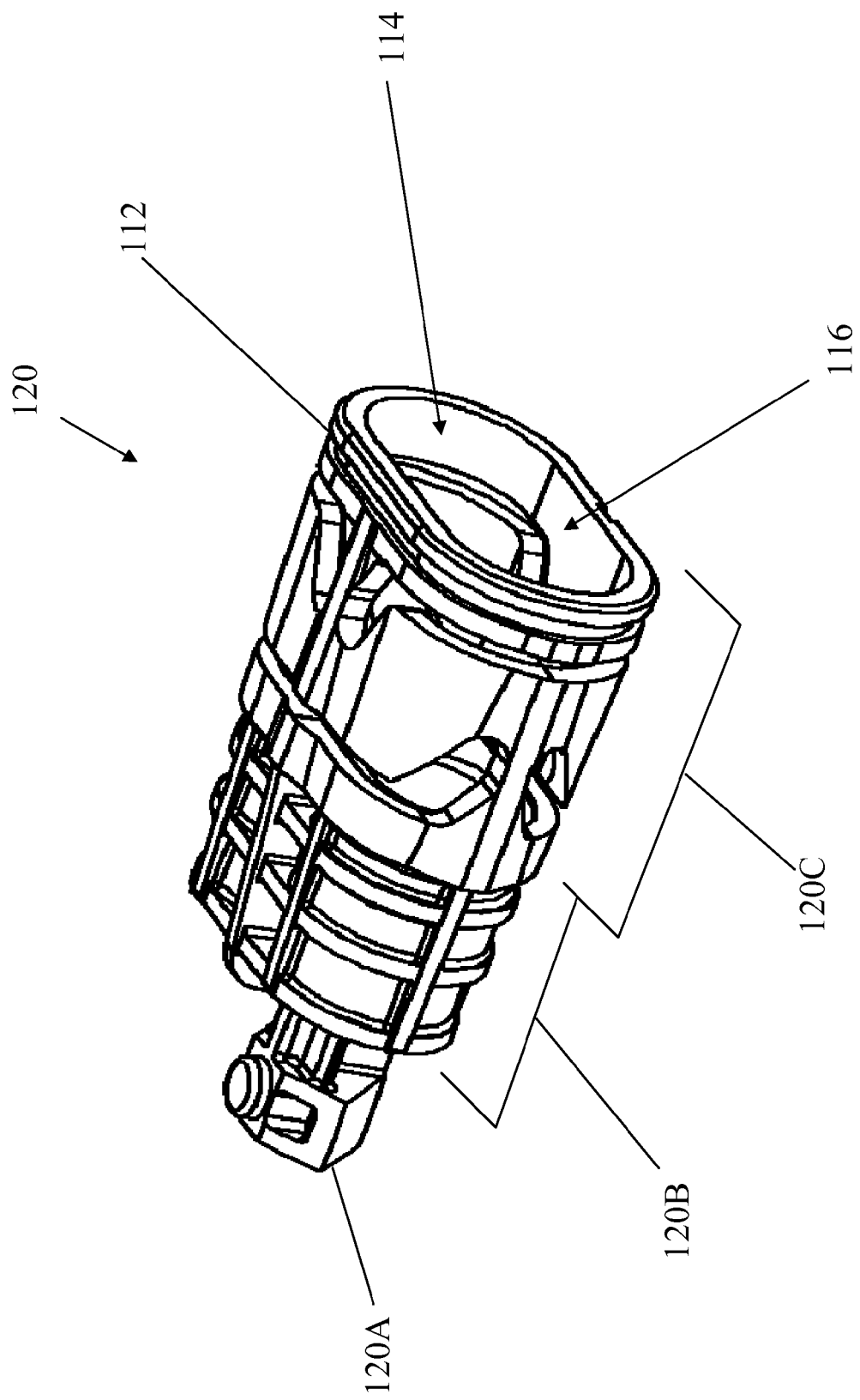
FIG. 1B is an isometric view of an optical bench structure consistent with an exemplary embodiment.

FIG. 1B is an isometric view of an optical bench structure 120. The optical bench structure 120 may have a pivot adjustor section 120A, a dual barrel section 120B, and a flexure section 120C. The optical bench sections 120A, 120B, and 120C may be a unitary piece or made of two or more pieces. The optical bench structure 120 can be made of metal, plastic, or other suitable material, or a combination thereof. The flexure section 120C may have a groove 112 or other feature that allows the optical bench to be coupled to the housing 102. The adjustors 104, 106 may contact the pivot adjustor section 120A to steer the coaligned pair of first and second collimated light beams relative to the housing 102 to allow the first beam 108 and second beam 110 to be boresighted to a weapon. The adjustors 104, 106 may be orthogonally offset 90 degrees from each other to provide elevation and windage adjustment of the coaligned and collimated light beams 108, 110 relative to the housing 102. Springs or other biasing mechanisms may be used to provide a counter force to the adjustors 104, 106. Alternatively, electrically controllable actuators, for example MEMS or piezoelectric actuators, may be used to steer the light beams 108, 110.

Figure 2A:
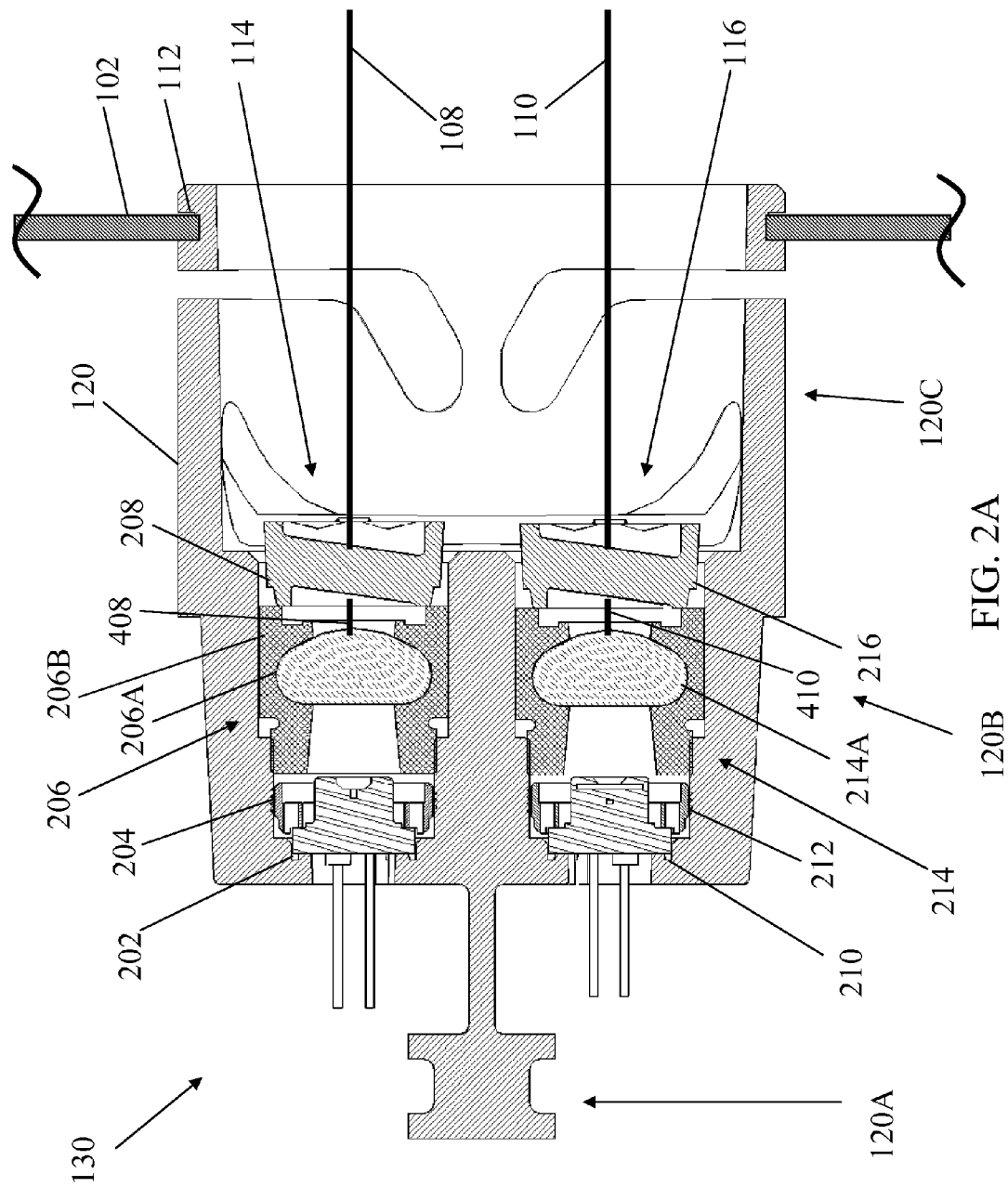
FIG. 2A is a cross-sectional view of an optical bench sub-assembly consistent with an exemplary embodiment.
Figure 2B:
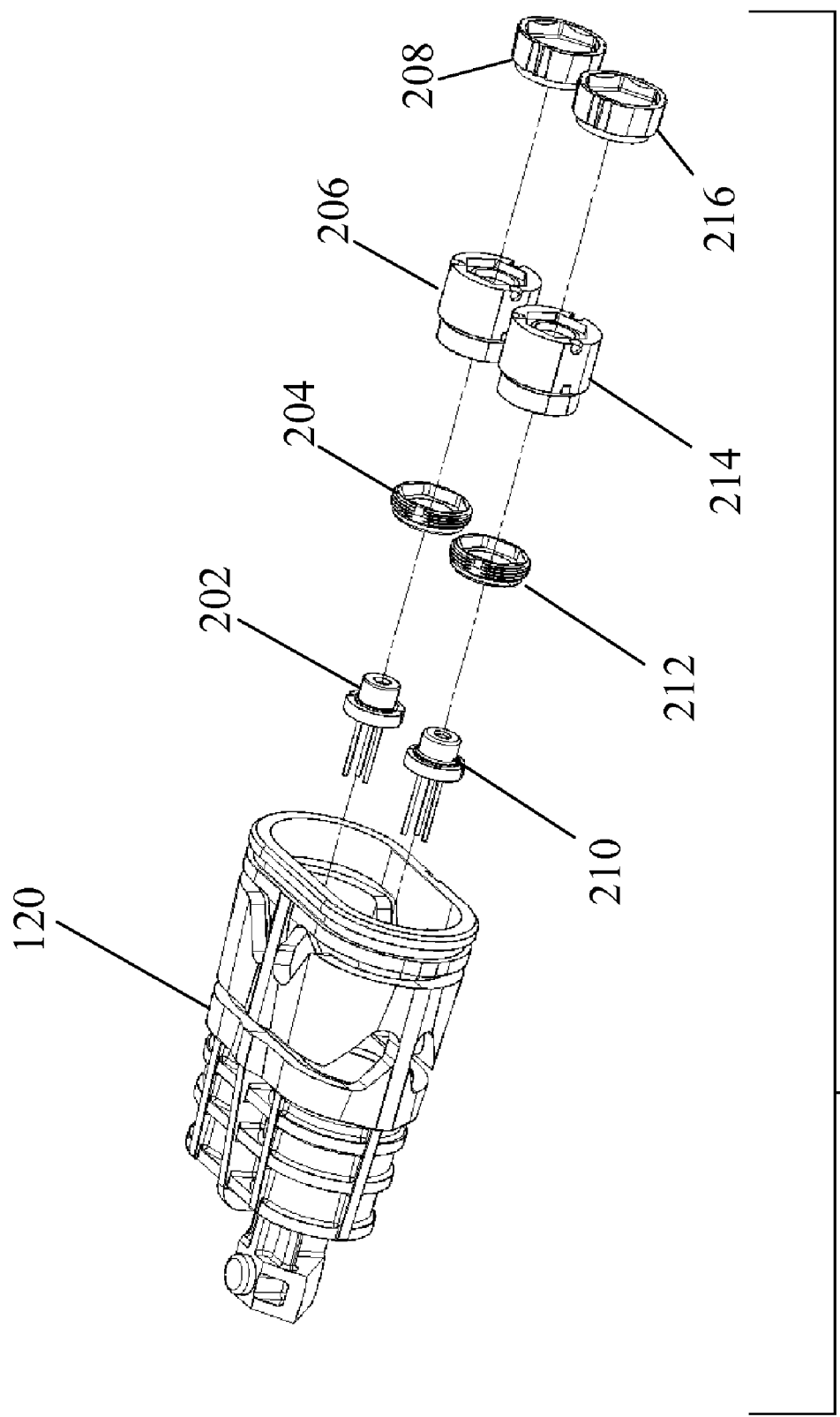
FIG. 2B is an exploded isometric view of the optical bench sub-assembly of FIG. 2A.

FIG. 2A is a section view and FIG. 2B is an exploded view of an optical bench assembly 130. The optical bench structure 120 may provide a frame to support electrical and optical components that may be secured to the optical bench structure 120 during the assembly process. The optical bench assembly 130 can incorporate two or more light sources of the same or different wavelength. In an exemplary embodiment two light sources are provided, one in the visible spectrum (400-750 nm), for example the output of a 635 nm laser diode, and one in the near infrared spectrum (750-3000 nm), for example the output of a 830 nm laser diode. A first laser diode 202 may be placed in the first barrel 114 of the optical bench structure 120 with its electrical leads extending out of an opening in the rear of the optical bench structure 120. A laser retainer 204 may be placed in the first barrel 114 and contact the laser diode 202. The laser retainer 204 may have external threads, grooves or other features that cooperate with threads or features on the inside surface of the first barrel 114 to hold the laser diode 202 in place. The first laser diode 202 may alternatively be inserted from the rear end of an optical bench. Epoxy or other adhesive or other suitable bond may be used to provide a more permanent bond between the laser retainer 204 and the optical bench structure 120. Alternatively, epoxy, other adhesives, other suitable bonds, an adhesive free clip, or a compliant flexure may be used in place of a threaded retainer to secure the first laser diode 202 inside the first barrel 114. The epoxy may be time, wavelength, or thermally sensitive to allow proper positioning prior to forming a permanent bond. Alternatively, the laser diode 202 and the laser retainer 204 may be hot or cold staked in place.

A collimating lens assembly 206 may next be placed in the first barrel 114 of the optical bench structure 120. The collimating lens assembly 206 may have a collimating lens 206A coupled to a lens retainer and/or lens cell 206B as shown in FIG. 2A. The lens retainer and/or lens cell 206B may have external threads, grooves or other features that cooperate with threads or features on the inside surface of the first barrel 114. A slip or light press fit of precision bores between barrel 114 and collimating lens assembly 206 may be used as a positioning aid and to minimize precession during alignment. An assembler, using a hollow tool, may rotate or slide the collimating lens assembly 206 into the first barrel 114 until a collimated light beam extends through the hollow portion of the tool and onto a target or measurement device. The hollow tool may have end features that cooperate with features on the lens retainer and/or cell 206B to allow it to rotate or slide the collimating lens assembly 206. Epoxy or other adhesive or other suitable bond or mechanical restraint may be used to provide a more permanent stable bond between the collimating lens assembly 206 and the optical bench structure 120. The epoxy may be time or wavelength or temperature sensitive to allow proper positioning prior to forming a permanent bond. The collimating lens assembly 206 may include a lens encapsulated by an overmold made of a suitable material, e.g. polyamide. Such an overmold is sometimes referred to as an IMA, in mold assembly, or as an overmold. Alternatively, a collimated light beam may be generated with a laser diode or other light source separated from a lens by a pin hole aperture. Lens assembly 206 could be manufactured as a single piece. For example, the elements of lens 206A and the cell 206B could be molded as a single piece out of an appropriate optical plastic, e.g. Zeonex® 480.

Figure 3B:
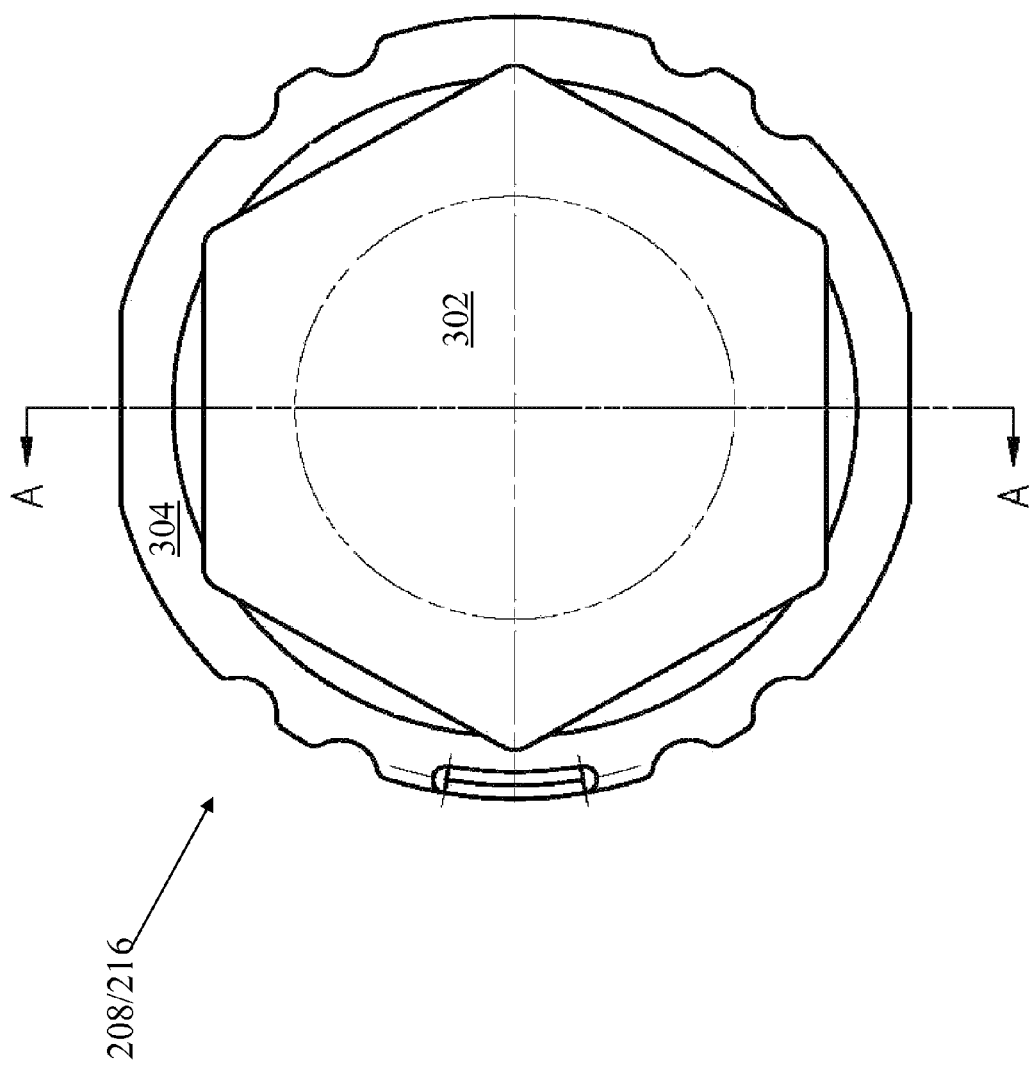
FIG. 3B is a front view of the prism of FIG. 3A.
Figure 3C:
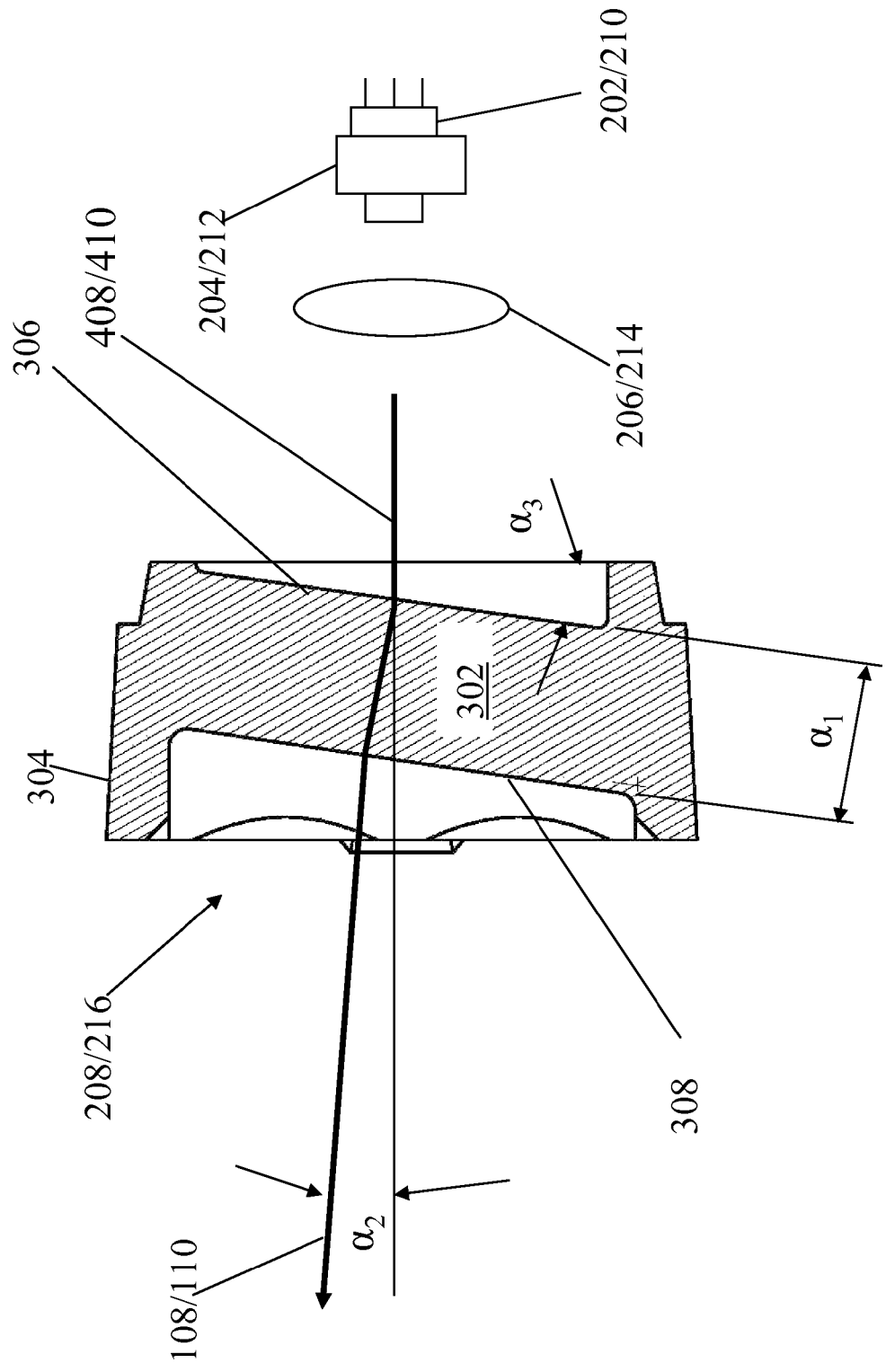
FIG. 3C is a cross-sectional view of the prism of FIG. 3A taken through line A-A in FIG. 3B spaced from a lens and laser diode.

A prism 208 may next be placed in the first barrel 114 of the optical bench structure 120. As shown in FIG. 3A and FIG. 3B, the prism 208 may have a central portion 302 surrounded by a rim portion 304 useful for mounting and orienting the prism 208. As shown in FIG. 3C, the central portion 302 may have an incoming surface 306 spaced from and at a first angle $\alpha_1$ to an outgoing surface 308. Light entering the prism 208 may be refracted by the incoming surface 306 and light exiting the prism 208 may be refracted by the second surface 308. Since the first surface 306 may be disposed at angle $\alpha_1$ to the second surface 308, the exiting light beam 108 may be directionally offset by an angle $\alpha_2$ to the incoming light beam. The second angle $\alpha_2$ may be a function of the first angle $\alpha_1$, the prism material, and the wavelength of the incoming light beam. The incoming surface 306 may be at an angle $\alpha_3$, for example 4-10 degrees off of perpendicular to the incoming light beam, to reduce reflection of the incoming light beam back towards the laser diode 202, which could disrupt normal operation of the light source, for example by interfering with a power monitoring photodiode.

The prism 208 may have external threads, grooves, a precision outer diameter or other features that cooperate with threads or features on the inside surface of the first barrel 114 or the collimating lens assembly 206. The prism 208 may be a moldable plastic, for example Zeonex® 480, an optical glass, or other suitable material. A plurality of prisms, each designed to refract light by a different angle $\alpha_2$, may be available to the assembler. Identifying features on the rim 304 may assist the assembler in distinguishing between these different prisms. The number of different available prisms may depend on a variety of factors including cost, precision of laser and lens alignment, and desired degree of resulting coalignment.

An assembler, using a hollow tool, may rotate the prism 208 (as discussed below) relative to the optical bench structure 120 with the exiting light beam extending on to a measurement device 400 (see FIG. 4B). The hollow tool may have end features that cooperate with features on the prism 208 to allow it to rotate the prism 208 into a desired rotational position. The hollow tool may have component placement features, such as vacuum suction or grippers, to aid in the positioning of the prism 208. Installation of prism 208 alters the direction of a light beam 408 exiting the collimating lens assembly 206 from a position on measurement tool 400 to a spot on a circle e.g., (108A, 108B or 108C) on measurement tool 400. The location of the spot on measurement device 400 and the radius of the circle are driven by the characteristics and orientation of the prism 208. By selecting one of the plurality of different prisms available, the light could be altered to a position on different circles, for example 108A, 108B or 108C on measurement tool 400. Rotation of prism 208 alters which position on the circle the light beam 108 falls onto. The measurements and calculations may allow for selection of an appropriate prism. The measurements and calculations may be employed during the assembly and alignment of the optical bench assembly 130 in the weapon mountable sight 100. The weapon sight user is not exposed to the measurements and calculations associated with prism selection and orientation.

Likewise, laser diode 210, laser retainer 212, collimating lens assembly 214 with collimating lens 214A, and prism 216 may be assembled and coupled to the optical bench structure 120 in similar fashion. Prism 216 may be rotated about its axis to generate a second ring of possible angular directions with the second collimated light beam 110. Installation of prism 216 alters the direction of a light beam 410 exiting the collimating lens assembly 214 from a position on measurement tool 400 to a position on different circles, for example 110A, 110B or 110C on measurement tool 400. If prisms 208 and 216 have sufficient optical power to overlap the circles, a pair of prism orientations will exist where the light beams 108 and 110 are coaligned. Using measurement tool 400, the choice of and orientation of prisms 208 and 216 can be made to achieve the most desirable coaligned solution. Typically, this desired solution is that closest to the mechanical neutral axis 402 of the optical bench structure 120. Coalignment close to the mechanical neutral axis 402 of the optical bench structure 120 may reduce the amount of user manipulation of the first adjustor 104 and the second adjustor 106 required to boresight the weapon sight and may provide a greater range of boresight adjustment available to the user. Once the desired rotational positions of the prisms 208, 216 has been determined, epoxy or other adhesive or other suitable bond may be used to provide a more permanent bond between the prisms 208, 216 and the optical bench structure 120. The epoxy may be time or wavelength or thermally sensitive to allow proper positioning prior to forming a permanent bond.

Figure 4A:
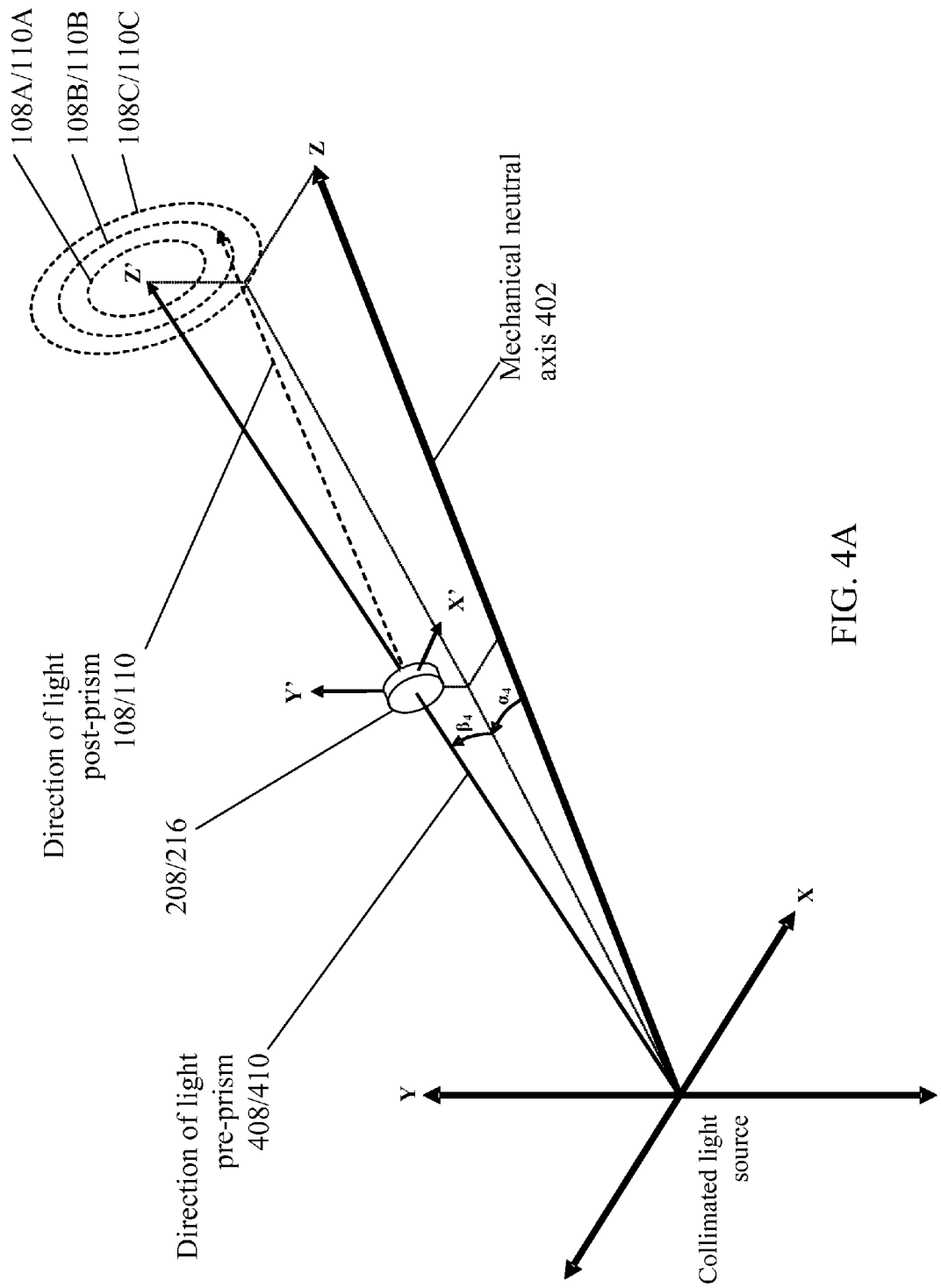
FIG. 4A is a 3-D plot useful in explaining the angular relationship between an actual light beam from a laser coupled with a prism and a mechanical neutral position for the weapon mountable sight of FIG. 1A.

FIG. 4A is a 3-D plot useful in explaining the relationship between the light beams 408, 410 from the collimated light source before the light beams are refracted by prisms 208, 216 respectively and a mechanical neutral axis 402 for the optical bench structure 120 or weapon mountable sight 100. The collimated light beam 408, 410 may be angularly displaced from the mechanical neutral axis 402 for the optical bench structure 120 by an angle $\alpha_4$ in a first plane and an angle $\beta_4$ in a second and orthogonal plane. Placing an appropriately oriented prism in series with each collimated light source can reduce the angular displacement to a direction 108, 110 closer to the mechanical neutral axis 402 for the optical bench structure 120 in addition to coaligning directions 108 and 110.

FIG. 4B shows a measurement tool 400 useful in coaligning exiting collimated light beams 108 and 110. During factory alignment, the first collimated light beam 408 and the second collimated light beam 410 may be reflected off of a parabolic mirror, passed through an infinity conjugate lens, or aimed down an optical range and hit a detection surface which may be an optical target or focal plane array. Information is extracted from this detection surface to generate a quantitative representation. The measurement tool 400 can directly measure the angle of the respective collimated light beams 408, 410 or 108, 110 from the mechanical neutral axis 402 which may be the mechanical neutral axis for the weapon mountable sight 100 or optical bench structure 120. The first angular light direction 408 is formed by the first laser diode 202 and first lens assembly 206. The second angular light direction 410 is formed by the second laser diode 210 and second lens assembly 214. The measurement tool is designed such that spatial offsets between light beams 408, 410 or 108, 110 (due to the light sources being physically offset in the optical bench structure 120) do not adversely affect the angular measurements of measurement tool 400. Any set of two or more light sources which overlap on measurement tool 400 are coaligned.

FIG. 4B shows a first ring 108A, a second ring 108B, and a third ring 108C of possible angular directions of light the first light beam 108 would trace as three different choices of prism 208 are rotated through a complete 360-degree rotation about its optical axis when prism 208 is placed in the path of light beam 408. A fourth ring 110A, a fifth ring 110B, and a sixth ring 110C of possible angular directions of light the light beam 110 would trace as three different choices of prism 216 are rotated through a complete 360-degree rotation about its optical axis when prism 216 is placed in the path of light beam 410. Each of the three prisms 208, 216 provides different angular degrees of refraction. The prism with the smallest first prism angle $\alpha_1$ produces the smallest ring of possible angular directions of light, 108A or 110A, and the prism with the largest first prism angle $\alpha_1$ produces the largest ring of possible angular directions of light, 108C or 110C. In the embodiment shown, the available prisms may generate four (4) mRad, twelve (12) mRad, and twenty (20) mRad of refraction. More or less choices and differing first prism angles $\alpha_1$ may be used without departing from the scope of the invention.

As shown in this example, the first, second, third, fourth, fifth, and sixth rings intersect at twelve positions (shown by eleven circles and one square). At these twelve positions the light beams 108 and 110 are coaligned. Note that not all prism choices may result in a valid coaligned solution, for example circles 108A and 110A in FIG. 4B do not overlap. Given three choices of prism, the number of valid coaligned solutions can vary from zero to eighteen, the arbitrarily chosen representation in FIG. 4B shows a configuration with (12) valid coaligned solutions. A processor coupled to the measurement tool 400 or a manual look-up table may help chose which prism the operator should place in the first barrel 114 and which prism the operator should place in the second barrel 116 based on which coaligned solution 108, 110 is closest to the mechanical neutral axis 402. In this example, the operator would install a first prism 208 configured to retract the incoming light beam 408 12 mRad (circle 108B), and a second prism 216 configured to refract the incoming light beam 410 12 mRad (circle 110B), with the hollow tool or other device and rotate the prisms 208, 216 until the angular directions of light beams 108 and 110 are coaligned and aimed as close as possible to the mechanical neutral axis 402. Prisms 208, 216 may then be secured to the optical bench structure 120. Note that there are two valid, coaligned solutions for every overlapping prism pair. The solution denoted by the square box on FIG. 4B is the desired solution in the case where it is desired to aim the coaligned lasers as close as possible to the mechanical neutral axis 402 of optical bench structure 120.

Once the beams 108, 110 are coaligned and components are secured in place, the optical bench assembly 130 could then be inserted in the housing 102. A user/shooter could then couple the housing 102 of the weapon mountable sight 100 to a weapon 504 and use the adjustors 104, 106 to boresight the coaligned collimated light beams 108, 110 as a combined pair in the optical bench assembly 130 to the weapon 504.

The prism 208 may be a lens that utilizes geometry of the lens and/or index of refraction of the lens to refract the light beam at a slight angle. However, embodiments of the invention are not limited to this configuration, and other lens types and optical components may be used to generate the change in angle of the light beam, for example, mirrors and lenses with designed and controlled molecular orientation to control the refraction angle. Using diffraction gratings; be they ruled, holographic, or otherwise; to bend light at a slight angle are also a feasible implementation.

Figure 5:
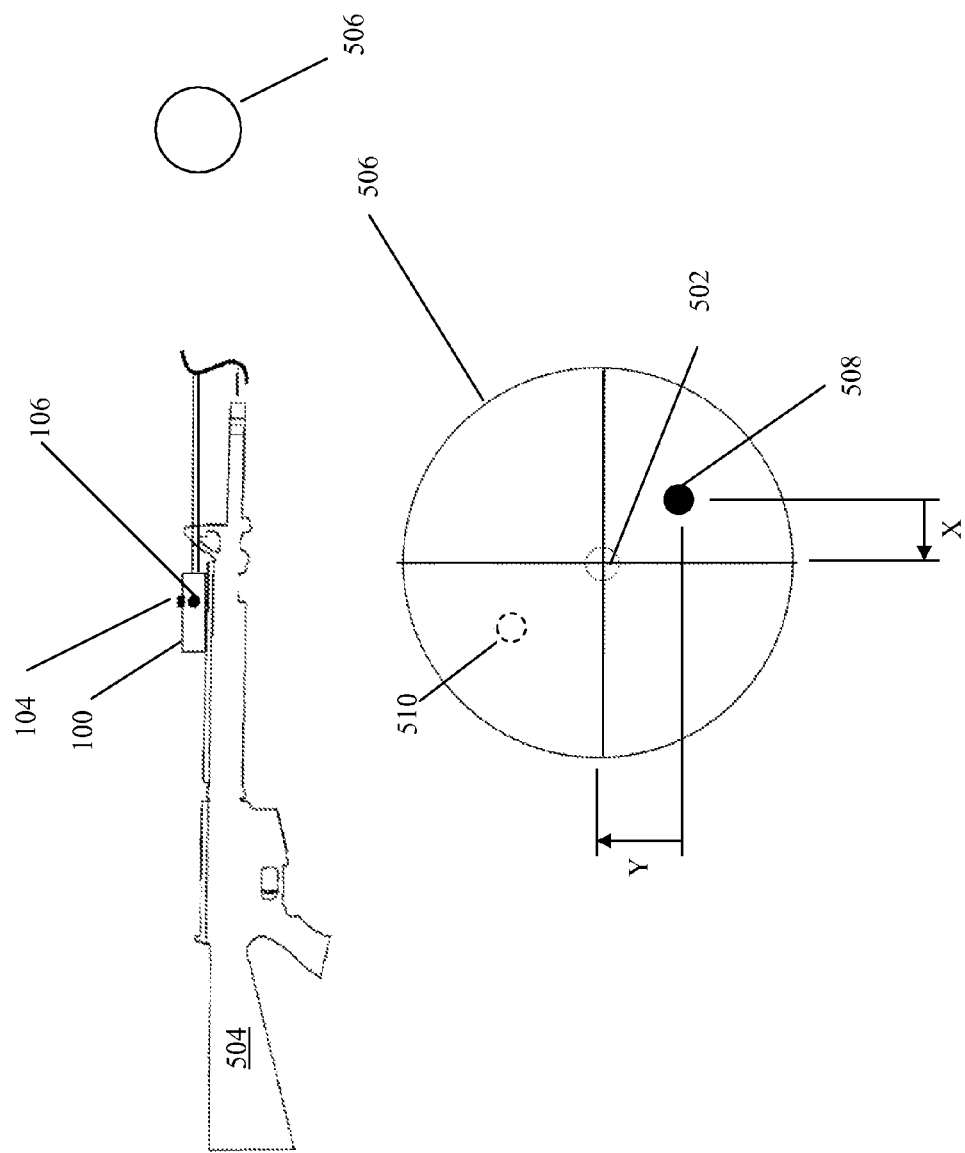
FIG. 5 is a side view of a weapon mountable sight attached to a weapon consistent an exemplary embodiment.

FIG. 5 is a side view of a weapon 504 with a weapon mountable sight 100 coupled thereto consistent with an exemplary embodiment. When the weapon mountable sight 100 is pointed at a target 506, the projected dots 508, 510 from the coaligned collimated light beams 108, 110 respectively may be offset from each other because of their physical offset in the optical bench. The dot 508 from the visible light source may be offset from a point of impact 502 of a projectile by a distance, "X" in the horizontal direction and a distance "Y" in the vertical direction when the target is at a known distance. The adjustors 104, 106 may be used to steer the coaligned pair of collimated light beams 108, 110 to be, within a finite angular tolerance, at a desired location relative to the center 502 of the target 506 to boresight the weapon mountable sight 100 to the weapon 504. This desired location may be impacted by considerations such as the projectile dropping over distance, the type of projectile used, or other factors that impact the accurate firing of the weapon 504.

Figure 6:
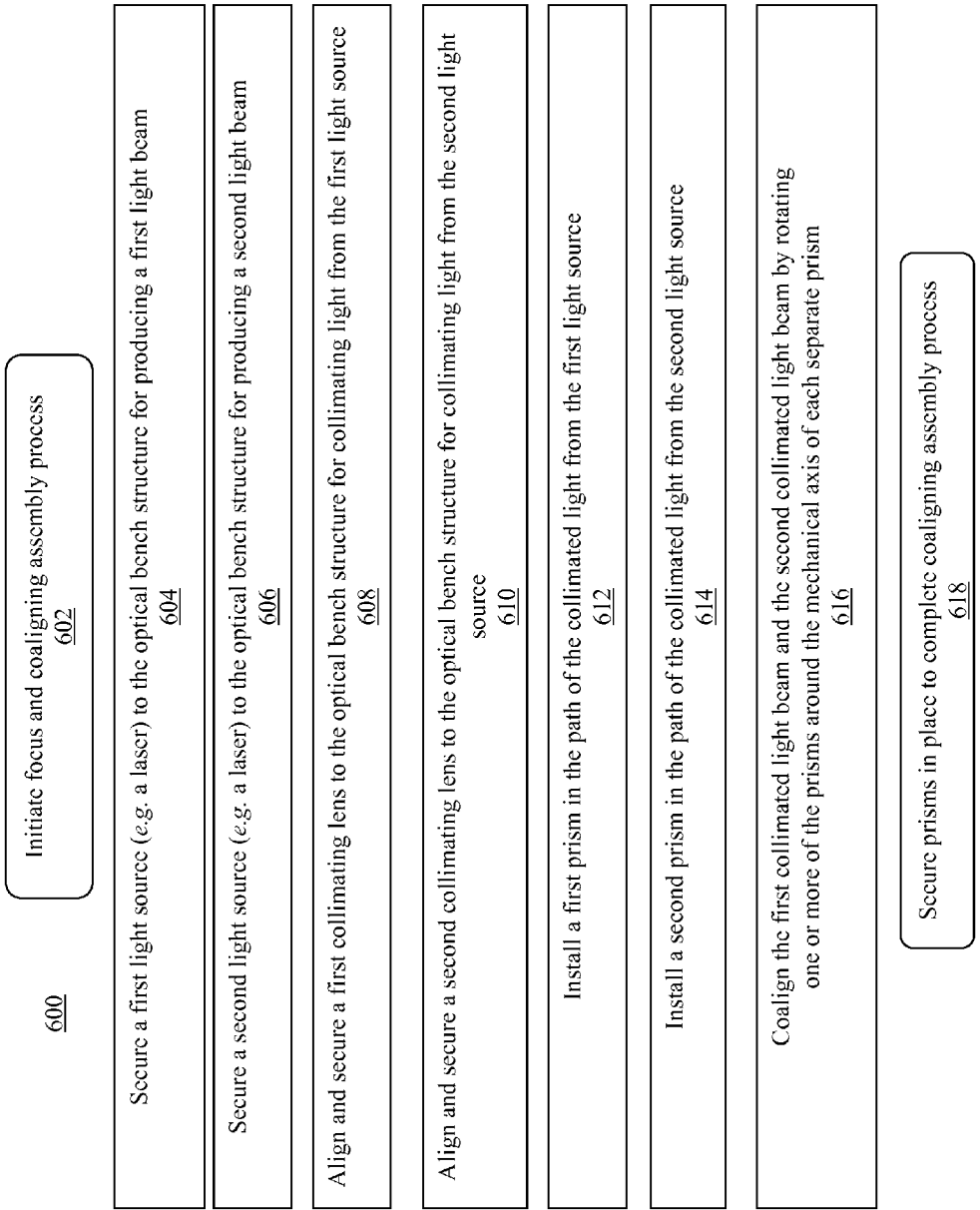
FIG. 6 is a flowchart illustrating steps used to coalign the first collimated light beam and a second collimated light beam consistent with an exemplary embodiment.

Referring to FIG. 6, a first collimated light beam and a second collimated light beam may be coaligned according to an exemplary embodiment method 600. The optical bench structure 120 may be used for the assembling process (block 602). A first light source 202 may be secured to the optical bench structure 120 for producing a first light beam (block 604). A second light source 210 may be secured to the optical bench structure 120 for producing a second light beam (block 606). A first collimating lens 206A may be secured to the optical bench structure 120 for collimating light from the first light source 202 (block 608). A second collimating lens 214A may be secured to the optical bench for collimating light from the second light source (block 610). An appropriate prism may be chosen for each optical path based on a measurement taken. A first prism 208 may be used to refract the collimated light from the first light source (block 612). A second prism 216 may be used to refract the collimated light from the second light source (block 614). The first collimated light beam 408 and the second collimated light beam 410 may be coaligned by rotating one or more of the prisms 208, 216 around a mechanical axis of the respective prism (block 616). The prisms 208, 216 may then be secured to the optical bench structure 120 or collimating lens assembly 206, 214 providing two collimated and coaligned beams of light (block 618).

It will be understood that the foregoing is only illustrative of the principles of the invention and that various modifications can be made by those skilled in the art without departing from the scope and spirit of the invention. Accordingly, such embodiments, for example focusing more than two light beams, will be recognized as within the scope of the present invention. Various aspects disclosed in the exemplary embodiments may be incorporated with aspects disclosed in other exemplary embodiments without departing from the scope of the invention. Persons skilled in the art will also appreciate that the present invention can be practiced by other than the previously described exemplary method, which are presented for purposes of illustration rather than of limitation and that the present invention is limited only by the claims that follow.

What is claimed is:

1. An optical bench assembly, comprising:
   an optical bench structure;
   a first light source disposed within the optical bench structure and configured to generate a first light beam;
   a second light source disposed within the optical bench structure and configured to generate a second light beam;
   a first lens secured to the optical bench structure a spaced distance from the first light source for focusing the first light beam into a first collimated light beam;
   a second lens secured to the optical bench structure a spaced distance from the second light source for focusing the second light beam into a second collimated light beam;
   a first prism aligned with the first collimated light beam, the first prism rotatable about a first axis to generate a first ring of possible angular directions of light with the first collimated light beam; and
   a second prism aligned with the second collimated light beam, the second prism rotatable about a second axis to generate a second ring of possible angular directions of light with the second collimated light beam, the first and second prisms secured to the optical bench structure when a first angle on the first ring aligns with a second angle on the second ring.

2. The optical bench assembly of claim 1, wherein the first light source is disposed within a first barrel in the optical bench structure, the first barrel having a threaded section configured to receive a first threaded portion of a first collimating lens assembly and wherein the second light source is disposed within a second barrel in the optical bench structure, the second barrel having a threaded section configured to receive a second threaded portion of a second collimating lens assembly.

3. The optical bench assembly of claim 1, wherein the first ring of possible angular directions of light overlaps the second ring of possible angular directions of light at a common direction close to a mechanical neutral axis of the optical bench structure.

4. The optical bench assembly of claim 1, wherein a first angle of the first prism and a second angle of the second prism are selected from a range of prism designs with different nominal deviation angles based on an angular offset of the first collimated light beam and the second collimated light beam from a mechanical neutral axis of the optical bench structure.

5. The optical bench assembly of claim 2, wherein an epoxy secures the first prism within the first barrel and secures the second prism within the second barrel.

6. The optical bench assembly of claim 1, wherein a first position on the first ring of possibly angular directions of light intersects with a second position on the second ring of possibly angular directions of light at a theoretical direction close to a mechanical neutral axis of the optical bench structure.

7. The optical bench assembly of claim 1, wherein the first prism has an incoming surface at a first angle to an exiting surface to cause an incoming light beam to exit the first prism at a second angle relative to the incoming light beam.

8. The optical bench assembly of claim 7, wherein the second angle is a function of the first angle, the prism material, and the wavelength of the incoming light beam.

9. The optical bench assembly of claim 1, wherein the first prism has an incoming surface at an angle sufficient to prevent back reflections capable of disrupting normal operation of the light source.

10. The optical bench assembly of claim 1, wherein an angle between an incoming surface of the first prism and an outgoing surface of the first prism affects the ring of possible angular directions of light.

11. The optical bench assembly of claim 1, wherein the first light beam is in the visible spectrum and the second light beam is in the infrared spectrum.

12. The optical bench assembly of claim 1, wherein the first light source and the second light source are lasers.

13. A weapon mountable sight comprising:
    a housing configured to be coupled to a weapon;
    an optical bench structure pivotably coupled to the housing;
    a first light source coupled to the optical bench structure for producing a first light beam;
    a second light source coupled to the optical bench structure for producing a second light beam;
    a first lens coupled to the optical bench structure for focusing the first light beam into a first collimated light beam;
    a second lens coupled to the optical bench structure for focusing the second light beam into a second collimated light beam;
    a first prism rotatable relative to the optical bench structure to align the first collimated light beam with the second collimated light beam; and a second prism rotatable relative to the optical bench structure to align the second collimated light beam with the first collimated light beam.

14. The weapon mountable sight of claim 13, wherein the optical bench structure has a first chamber and a second chamber and the first chamber has a threaded section configured to receive a first threaded portion of a first collimating lens assembly and the second chamber has a threaded section configured to receive a second threaded portion of a second collimating lens assembly.

15. The weapon mountable sight of claim 13, wherein the first prism when rotated generates a first ring of possible angular directions of light with the first collimated light beam and the second prism when rotated generates a second ring of possible angular directions of light with the second collimated light beam, the first and second prisms secured to the optical bench structure when a first angular direction of light on the first ring aligns with a second angular direction of light on the second ring.

16. The weapon mountable sight of claim 13, wherein a first angle of the first prism and a second angle of the second prism are selected from a range of prism designs with different nominal deviation angles based on an angular offset of the first collimated light beam and the second collimated light beam from a center direction of the optical bench.

17. The weapon mountable sight of claim 14, wherein an epoxy secures the first prism within the first chamber and secures the second prism within the second chamber.

18. The weapon mountable sight of claim 13, wherein the first prism has an incoming surface at a first angle to an exiting surface to cause an incoming light beam to exit the prism at a second angle relative to the incoming light beam.

19. The weapon mountable sight of claim 18, wherein the second angle is a function of the first angle, the prism material, and the wavelength of the incoming light beam.

20. The weapon mountable sight of claim 13, wherein the first prism has an incoming surface at an angle sufficient to prevent back reflections capable of disrupting normal operation of the light source.

21. The weapon mountable sight of claim 13, wherein an angle between an incoming surface of the first prism and an outgoing surface of the first prism affects the refraction of the first light beam.

22. The weapon mountable sight of claim 13, wherein the first light source is in the visible spectrum and the second light source is in the infrared spectrum.

23. The weapon mountable sight of claim 13, wherein the first light source and the second light source are lasers.

24. A method for assembling an optical bench assembly comprising the steps of:
securing a first collimating lens to an optical bench structure for collimating light from a first light source;
securing a second collimating lens to the optical bench structure for collimating light from a second light source;
installing a first prism in the path of the collimated light from the first light source;
installing a second prism in the path of the collimated light from the second light source; and
coaligning collimated light from the first light source and collimated light from the second light source by rotating one or more of the prisms around an axis of the respective prism.

25. The method of claim 24, subsequent to the action of coaligning the collimated light further comprises the step of securing the first prism and the second prism to the optical bench structure.

26. The method of claim 24, wherein the action of coaligning the collimated light from the first light source and the collimated light from the second light source further comprises:
rotating the first prism and generating a first ring of possible angular directions of light with the collimated light from the first light source;
rotating the second prism and generating a second ring of possible angular directions of light with the collimated light from the second light source; and
securing the first prism and second prisms to the optical bench structure when a first direction of light on the first ring intersects with a second direction of light on the second ring.

27. The method of claim 26, wherein the first ring of possible angular directions of light and the second ring of possible angular directions of light intersect at an angle close to a mechanical neutral axis of the optical bench structure based on the selected first and second prisms.

28. The method of claim 24, further comprising the step of selecting a first prism with an angle between an incoming light surface and an outgoing light surface based on an angular offset of the first collimated light beam and the second collimated light beam from a mechanical neutral axis of the optical bench structure before the first and second prisms are installed in the path of their respective collimated light.

29. The method of claim 24, further comprising the steps of:
securing a first light source for producing a first light beam to the optical bench structure; and
securing a second light source for producing a second light beam to the optical bench structure.

30. A method for assembling an optical bench assembly comprising the steps of:
generating a first collimated light beam;
generating a second collimated light beam;
installing a first prism in the optical path of the first collimated light beam;
installing a second prism in the optical path of the second collimated light beam; and
coaligning the first collimated light beam and the second collimated light beam by rotating one or more of the prisms around an optical axis of the respective prism.

31. An optical bench comprising:
an optical bench structure;
a first source of collimated light;
a second source of collimated light;
a first prism aligned with collimated light from the first source of collimated light, the first prism rotatable about a first axis to generate a first ring of possible angular directions of light with the collimated light from the first source of collimated light; and
a second prism aligned with collimated light from the second source of collimated light, the second prism rotatable about a second axis to generate a second ring of possible angular directions of light with the collimated light from the second source of collimated light, the first and second prisms secured in place when a first direction of light on the first ring intersects with a second direction of light on the second ring.

* * * * *